United States Patent [19]
Reese et al.

[11] Patent Number: 5,805,830
[45] Date of Patent: Sep. 8, 1998

[54] METHOD AND APPARATUS FOR MANAGING COMMUNICATIONS WITH SELECTIVE SUBSETS OF CONFERENCE PARTICIPANTS

[75] Inventors: Ken Reese, Portland; Lewis Rothrock, Beaverton, both of Oreg.

[73] Assignee: Intel Corporation, Santa Clara, Calif.

[21] Appl. No.: 910,805

[22] Filed: Aug. 13, 1997

Related U.S. Application Data

[63] Continuation of Ser. No. 315,940, Sep. 30, 1994, abandoned.

[51] Int. Cl.[6] .......................... G06F 13/14; G06F 15/177
[52] U.S. Cl. ...................... 395/200.35; 370/260; 345/330
[58] Field of Search ....................... 395/200.04, 200.02, 395/200.15, 200.19, 311, 312, 200.34, 200.35, 200.68, 200.79; 370/62, 60.1, 61, 94.3, 260, 265, 270; 345/330

[56] References Cited

U.S. PATENT DOCUMENTS

| | | | |
|---|---|---|---|
| 5,103,444 | 4/1992 | Leung et al. ............................... | 370/60 |
| 5,247,615 | 9/1993 | Mori et al. ................................ | 395/200 |
| 5,289,460 | 2/1994 | Drake, Jr. et al. ......................... | 370/17 |
| 5,365,523 | 11/1994 | Derby et al. ............................. | 370/85.2 |
| 5,461,665 | 10/1995 | Shur et al. ................................ | 379/67 |

OTHER PUBLICATIONS

CE Software, QuickMail—User's Guide—Administrator Edition, Chapter 5, pp. 5–33 to 5–38, Dec. 1994.
Que, Microsoft Office 6–in–1, Part 5, Chapter 12–14, pp. 548–559, Dec. 1994.
CE Software, "Quick Mail—Usre's Guide–Administrator's Edition, " Cover and Title Page, Dec. 1994.
Howard, S; "QuickMail 3 post minimal gains"; MacWEEK v8 n34 p. 1(2), Aug. 22, 1994.
Mallory, J; "CE Sftware shipping QuickMail upgrade"; Newsbytes pNEWO8220024, Aug. 22, 1994.

*Primary Examiner*—Mark H. Rinehart
*Attorney, Agent, or Firm*—Blakely, Sokoloff, Taylor & Zafman

[57] ABSTRACT

A first communication manager (CM) equipped with the ability to dynamically maintain a first multiple of communication recipient distribution lists is provided to a computer system. The first CM is also provided with operational logic capable of being instructed to send a particular piece of communication to all members of a particularized one of the distribution lists by naming only the distribution list. In one embodiment, a second CM is further provided. The second CM is equipped with the ability to dynamically maintain a second multiple of communication recipient distribution lists, the second distribution lists being a superset of the first distribution lists. The second CM is further equipped to track whether a corresponding distribution list is maintained by the first CM for each of its distribution lists, and their usage counts by executing applications. Lastly, the second CM is further equipped to dynamically adjust its manner of instructing the first CM on recipients of communications.

31 Claims, 13 Drawing Sheets

METHOD AND APPARATUS FOR MANAGING COMMUNICATIONS WITH SELECTIVE SUBSETS OF CONFERENCE PARTICIPANTS

This is a continuation of application Ser. No. 08/315,940 filed Sep. 30, 1994, now abandoned.

BACKGROUND OF THE INVENTION

1. Field of the Invention

The present invention relates to the fields of computer systems, and computer system conferencing. More specifically, the present invention relates to communication management on a computer system, including a computer conferencing system.

2. Background Information

With the continuing advances in computing capacity and connectivity of computer systems, more and more computer systems are capable of connecting to each other and allowing their users to conference with each other. Particular examples of such computer systems and conferencing applications are disclosed in U.S. patent application, Ser. No. 08/170,398, filed on Dec. 20, 1993, entitled Method and Apparatus For Joining Participants In A Computer Conferencing System.

Typically, communications between the computer systems, including the computer systems disclosed in the above identified US patent application, are accomplished using application independent communications managers. In other words, each computer system has an application independent communications manager responsible for interfacing with the communication hardware of the computer system, and performing the physical sending and receiving of communications with the other computer systems. The advantage of using application independent communications managers is obvious. Only one communications manager is required per system, and it can be used by all applications running on the system.

However, the traditional application independent communications manager can only be instructed to send a particular piece of communication to either all connected computer systems or a particularized computer system. In either case the communications manager will allocate a buffer and store the communication to be transmitted in the buffer. In the broadcasting case, the communications manager will transmit the communication onto the network with a "token" identifying all connected computer systems as intended recipients. In the particularized sending case, the communications manager will transmit the communication onto the network with a "token" identifying a particularized intended recipient.

In other words, if a communication is to be sent to a subset of the connected computer systems, the application has to instruct the communications manager repeatedly, each time with a different particularized recipient. The communications manager in turn will wind up employing multiple buffers, one for each particularized recipient, even if the communications being sent to these recipients are identical.

Thus, it is desirable to have a more efficient approach to managing communications with selective subsets of the connected computer systems or conference participants, without sacrificing the ability to share the communications manager across multiple applications. As will be disclosed in more detail below, the present invention provides for a method and apparatus that achieves these and other desirable results.

SUMMARY OF THE INVENTION

These and other desirable results are advantageously achieved by providing a low-level communications manager (CM) equipped with the ability to dynamically maintain multiple communication recipient distribution lists (hereinafter distribution lists). More specifically, the low level CM maintains one or more communication recipient identifiers in each distribution list, and a complementary distribution list participant membership list containing communication recipient identifiers and their associated physical information.

The low level CM is further provided with operational logic capable of being instructed to send a particular piece of communication to all members of a particularized distribution list by naming only the distribution list. In response, the low level CM will allocate only one buffer for storage of the communication to be sent, and repeatedly transmits the content of the buffer to the members of the communication recipient distribution list, one recipient member at a time, until all recipient members have been sent the communication.

In one embodiment, to ensure the sharability characteristic of the low level CM, it is further equipped with the ability to limit the number of distribution lists it dynamically maintains. More specifically, the low level CM is equipped with the ability to reject further creation of distribution lists, once its capacity limit for distribution list has been reached.

Under this embodiment, a mid-level CM equipped with complementary ability to dynamically maintain its own copies of distribution lists is further provided. The mid-level CM is equipped to track whether a corresponding distribution list is maintained by the low level CM. The mid-level CM is also equipped to track how many applications are using each distribution list. Lastly, the mid-level CM is further equipped to dynamically adjust its manner of instructing the low level CM on communication recipients.

For distribution lists that are also maintained by the low level CM, the mid-level CM will instruct the low level CM on communication recipients by naming only the names of the distribution lists. However, for distribution lists that are not maintained by the low level CM, the mid-level CM will instruct the low level CM on communication recipients in the traditional manner, i.e. repeatedly naming only one particularized recipient at a time.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention.

Figure 1:
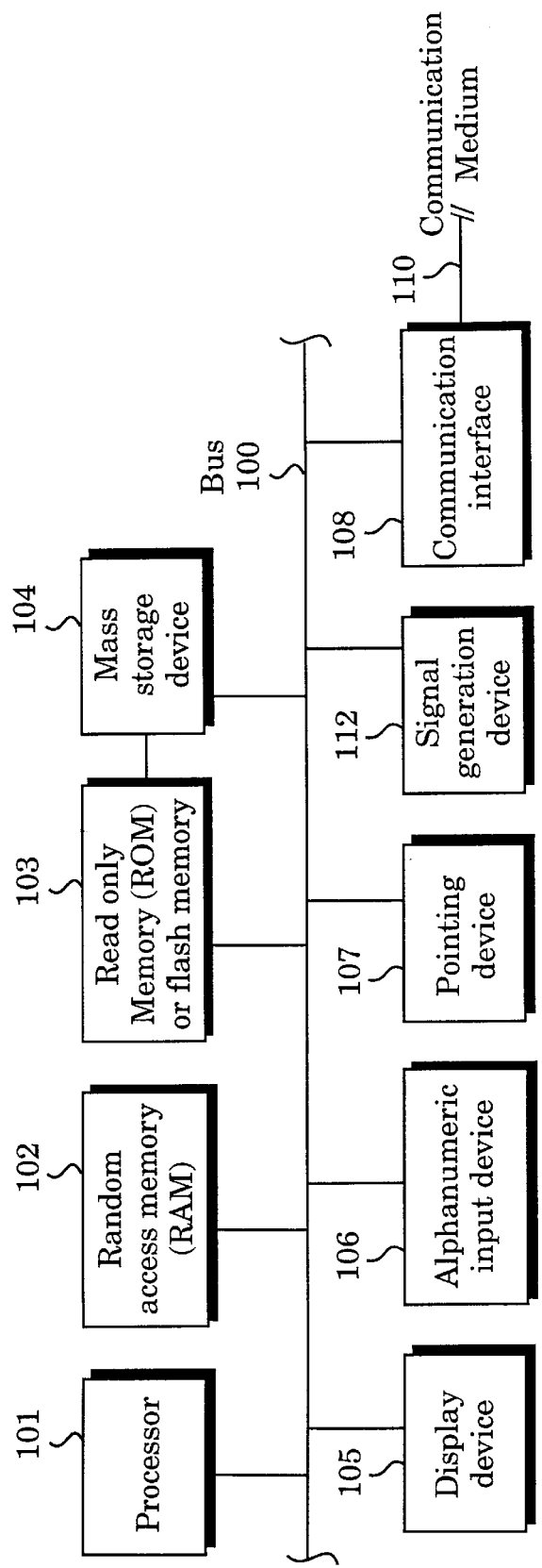
FIG. 1 illustrates an exemplary computer system incorporating the teachings of the present invention.

Referring now to FIG. 1, a block diagram illustrating the hardware components of an exemplary computer system incorporating the teachings of the present invention is shown. The exemplary computer system comprises a bus 100 for communicating information between computer system components. These components coupled to bus 100 include processor 101. In one embodiment, processor 101 is an i486 brand microprocessor manufactured by Intel Corporation, Santa Clara, Calif. The i486 mark is a trademark of Intel Corporation. It will be apparent to those of ordinary skill in the art that other equivalent processors may be used with the present invention. Other system components include Random Access Memory (RAM) 102, Read Only Memory (ROM) 103, and mass storage device or disk drive 104.

The exemplary computer system also includes display device 105 coupled to the bus 100 for displaying information to a computer user, an alphanumeric input device 106 coupled to the bus 100 for communicating information and command selections to the processor 101, a pointing device or cursor control device 107 coupled to the bus 100 for communicating information and command selections to processor 101, and a signal generation device 112 coupled to the bus 100 for communicating command selections to the processor 101. Display device 105 may be a liquid crystal device, a cathode ray tube, or other suitable display device. Alphanumeric input device 106 is typically an alphanumeric or function key keyboard. Pointing device or cursor control device 107 is typically a mouse or trackball device allowing the computer user to dynamically signal the two dimensional movement of a visible symbol (i.e. cursor) on the display screen of display device 105. Many implementations of the cursor control device 107 are well known in the art including trackball systems, mouse systems, joysticks, or special keys on the alphanumeric input device 106 capable of signaling movement in a given direction. Signal generation device 112 is typically implemented as a button or switch located on or near the cursor control device 107. The physical proximity of cursor control device 107 and signal generation device 112 allows a user to manipulate both devices simultaneously with one hand. The signal generation device may be operated between two control states: an active control state typically initiated by depression of a mouse button, and an inactive control state typically initiated by releasing the mouse button.

The exemplary computer system further includes a communication interface 108. Communication interface 108 is coupled to communication medium 110. Communication interface 108 provides a means for the computer system to communicate with a network of other computer systems. A variety of networks or communication media are well-known in the art. These communication media 110 include well-known Local Area Networks (LAN) such as Ethernet, Wide Area Networks (WAN), telephone modem links, wireless or cellular, or other well-known and conventional computer networking technology. The configuration and interconnection of computer system components as illustrated in FIG. 1 is well known to those of ordinary skill in the art.

Figure 2:
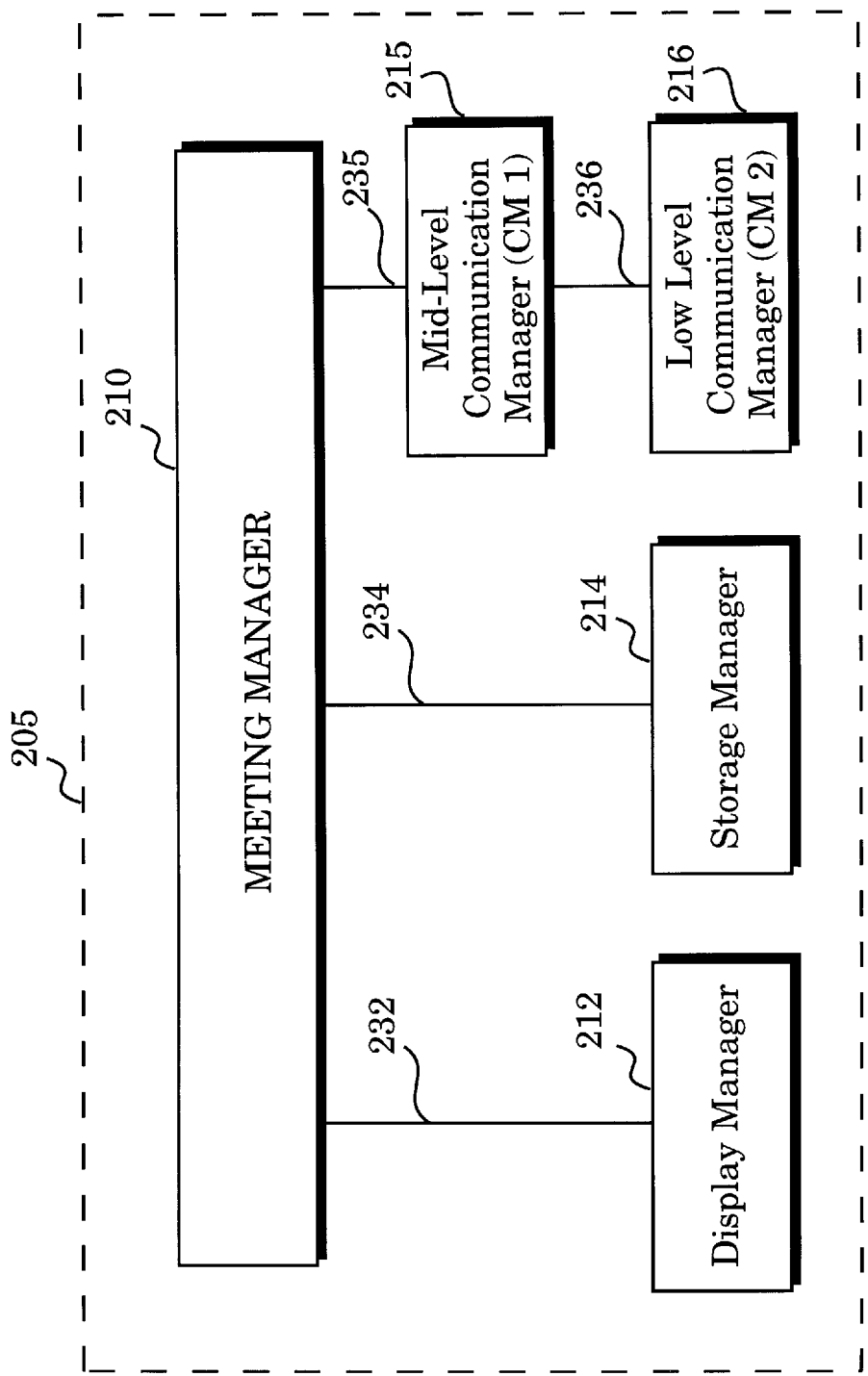
FIG. 2 illustrates the major software components of the computer systems of FIG. 1.

Referring now to FIG. 2, a block diagram illustrating the software architecture 205 of the exemplary computer system of FIG. 1 is shown. The exemplary computer system comprises software operably disposed within random access memory (RAM) 102 and executed by processor 101. The software architecture 205 comprises a meeting manager component 210, a display manager component 212, a mid-level CM component 215, a low-level CM component 216, and an optional mass storage manger component 214.

The two CMs 215 and 216 jointly provide a software interface to the communication hardware interface 108. The two CMs 215 and 216 comprise processing logic and data specific to the communication medium 110 being used for a particular conferencing application. In general, the two CMs 215 and 216 provide an indication to meeting manager 210 when a new conference participant connects to communications medium 110 or when a message transferred across communications medium 110 arrives for processing by meeting manager 210. The two CMs 215 and 216 are also responsible for sending messages across communications medium 110 on behalf of the meeting manager 210. In particular, the two CMs 215 and 216 incorporate the teachings of the present invention allowing the meeting manager 210 to selectively designate subsets of the conference participants as recipients of the messages, instead of the traditional one or all binary destinations. The meeting manager 210 communicates with the mid-level CM 215 through interface 235, which in turn communicates with the low level CM 216 across interface 236. With the exception of the teachings of the present invention, these communications interface details for a particular network are well known to those of ordinary skill in the art. In addition, techniques for message passing across a network are well known in the art. The information exchanged between the meeting manager 210 and the two CMs 215 and 216 are similar to those described in detail in the above identified US patent application, which is hereby fully incorporated by reference.

As will be obvious from the discussion to follow, the techniques of the present invention are generally applicable to any computer network or data communication medium including local area networks (LAN), wide area networks (WAN), telephone modems communication links, wireless communications links, or any other form of communications medium. Any data communications medium providing a capability for conferencing two or more conference participants can benefit by the techniques taught by the present invention.

Meeting manager 210 comprises data structures and processing logic for managing conferences with other conference participants on the connected computer systems. In particular, for messages intended only for a subset of the conference participants, the meeting manager 210 exploits the ability of the two CMs 215 and 216 to receive a single designation for the subset of conference participants. With the exception of the teachings of the present invention, these data structures and the processing logic of meeting manager 210 are described in detail in the incorporated by reference US patent application.

Display manager 212 comprises processing logic for displaying information on display device 105 and for processing user input provided through user input devices. User input devices include alphanumeric input device 106, pointing device or cursor control device 107, a signal generation device or mouse button 112, and other conventional devices for providing user input to a computer system. The display manager 212 in one embodiment performs mainly a function of displaying status information to a user on display device 105. Conventional methods exist for providing this display function. In other situations, display manager 212 provides command selections and other information to meeting manager 210 via interface 232. The information so provided is also described in detail in the incorporated by reference US patent application.

Storage manager 214 provides the capability for storing meeting information on a mass storage device or hard disk 104. Similarly, previously stored meeting information may be retrieved from mass storage device 104 through mass storage interface (not shown) and provided to meeting manager 210. The permanent storage of meeting information is advantageous; because, conference participants may disconnect from a meeting and retain the meeting information generated up to that point on mass storage device 104. At a subsequent time, the conference participant may rejoin the meeting and recover the information previously stored on mass storage device 104. This capability allows a more efficient synchronization with other conference participants. The low level details of mass storage interface and mass storage device 104, however, are well known to those of ordinary skill in the art.

Figure 3:
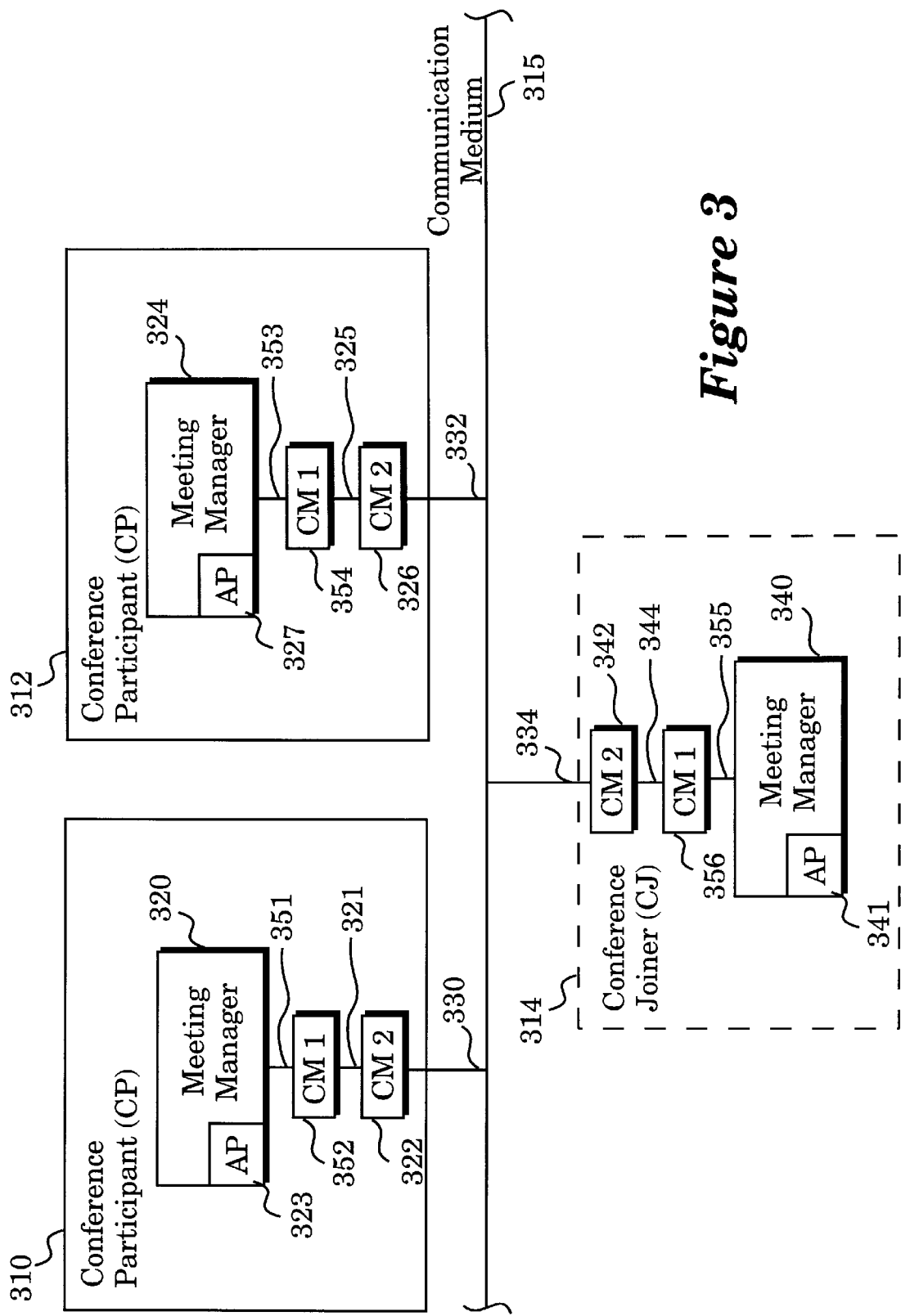
FIG. 3 illustrates a network of the exemplary computer systems of FIG. 1.

Referring now to FIG. 3, a typical example of a data conferencing configuration using the exemplary computer system of FIG. 1 is illustrated. This sample data conferencing configuration comprises two conference participants 310 and 312 and a joining conference participant 314 coupled via communications medium 315. It will be apparent to one of ordinary skill in the art that any number of conference participants may be joined via a communications medium in the manner as illustrated in FIG. 3. In the example of FIG. 3, each of the conference participants 310, 312, and 314 execute the meeting manager processing logic. Similarly, each of the conference participants includes a mid and low level CM pair of the present invention (i.e. 322 and 352, 326 and 354, and 342 and 356) coupled between communications medium 315 and meeting manager processing logic (i.e. 320, 324, and 340, respectively). The meeting manager software and the communications manager software in each of the conference participants are substantially the same logic. Thus, each conference participant includes the same conferencing capabilities as any other conferencing participant. The one exception to this rule is the assignment of an arbitrator participant, which is described in detail in the incorporated by reference U.S. patent application.

FIG. 3 illustrates a typical data conferencing configuration comprising a plurality of conference participants. In a typical conference scenario, two or more conference participants will initiate a conference or meeting by connecting to each other across communications medium 315. In the example of FIG. 3, conference participants 310 and 312 initially create a meeting (i.e. a connection) with each other across communications medium 315. As the meeting progresses, information is shared between participant 310 and participant 312 as controlled by meeting manager 320 and meeting manager 324 of each respective conference participant. The arbitrator participant, conference participant 310 in this example, is responsible for maintaining and dispersing the current and cumulative meeting information to selective subsets of conference participants. As conference participants join the conference subsequent to the initiation of a meeting, such as conference joiner 314, arbitrator participant 310 is responsible for communicating with meeting manger 340 of joining participant 314 to merge the joining participant 314 into the conference. The techniques for performing this merge and join operations are described in the incorporated by reference US patent application.

Figure 7:
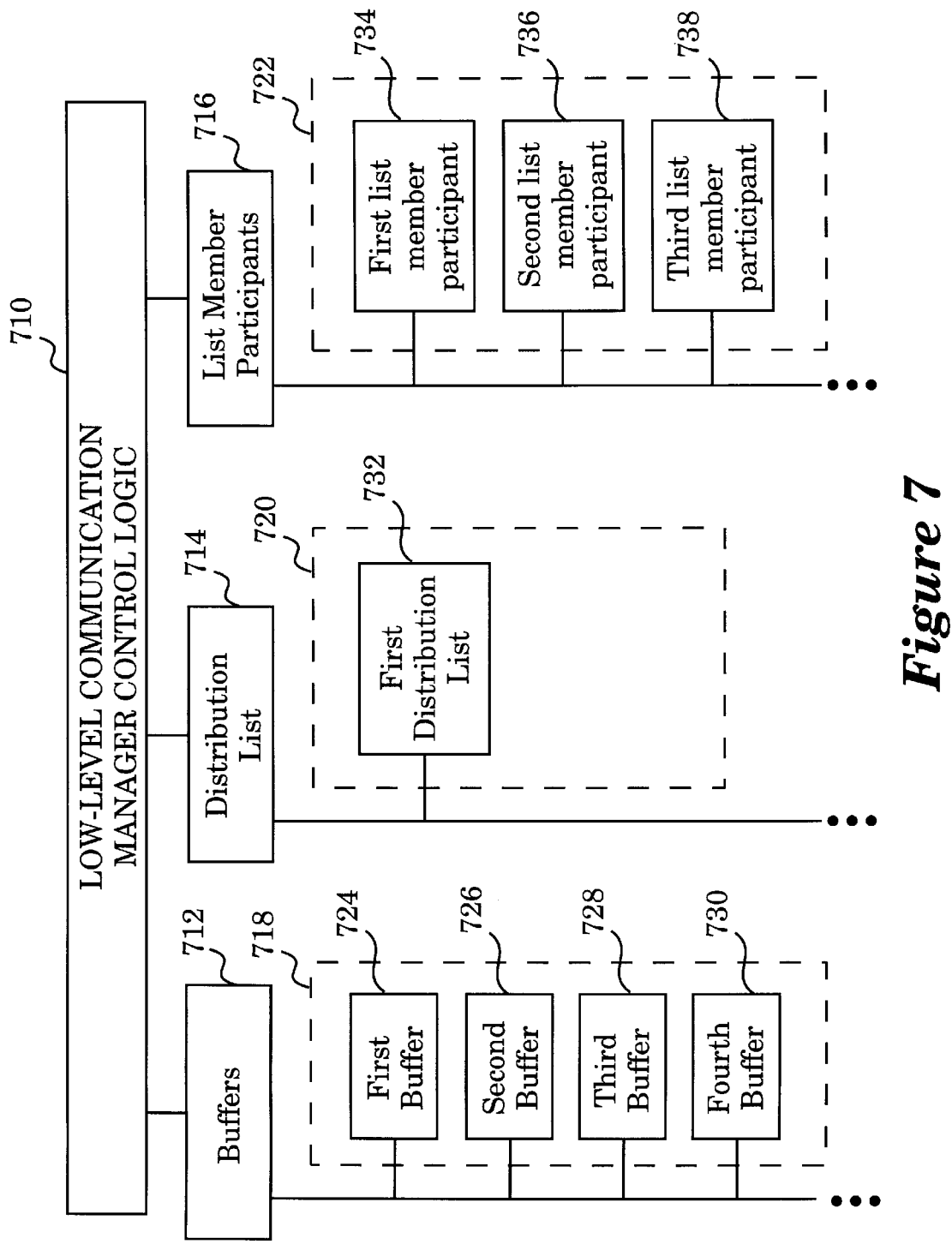
FIG. 7 illustrates one embodiment of the low-level CM of FIG. 2 in further detail.

Skipping now to FIG. 7, a block diagram illustrating three basic objects manipulated by the low level CM control logic 710 is shown. These basic objects include a buffer object 712 having a number of buffer instances 718, a distribution list object 714 having a number of distribution lists 720, and a distribution list member participant list 716 having a number of member participant instances 722. The buffer instances 718 store communications being sent or received. The distribution list instances 720 store recipient member identifiers. The member participant instances 722 store member participant identifiers, and relevant information about these member participants. A member participant may be a member participant of multiple distribution lists. A member participant identification will be maintained in each of the distribution list instances 720 the member participant is a member, however, only one member participant instance 722 will be maintained under the distribution list member participant object 716.

As will be obvious from the description to follow, the present invention may also be practiced with the distribution list instances 720 storing other distribution list identifiers, in addition to member participant identifiers. In other words, the present invention may be practiced with one or more levels of "nested" distribution lists. For example, distribution list X may contain A and B which are remote recipients as well as Y which identifies another distribution list having C and D remote recipients. (A & B are unnested remote recipients of X, whereas C & D are nested remote recipient of X.)

Figure 8:
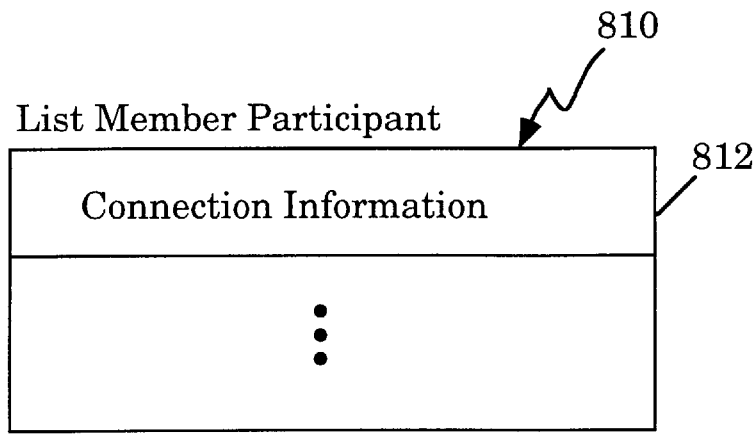
FIG. 8 illustrates one embodiment of a list member participant of the low-level CM in further detail.

Referring now briefly to FIG. 8, where the content of each list member participant instance 810 is illustrated. Each list member participant instance 810 includes the connection information 812 of the member participant.

Figure 9:
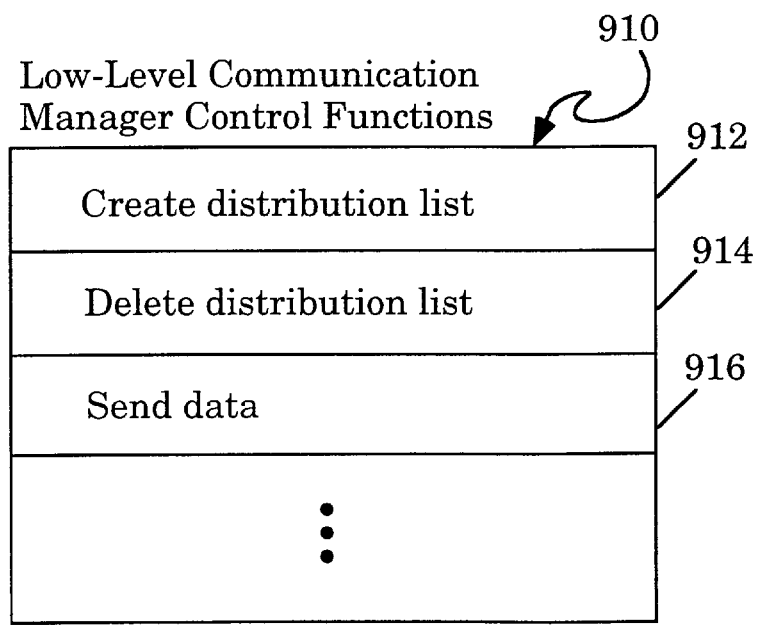
FIG. 9 illustrates one embodiment of the manager control functions of the lowlevel CM in further detail.

Referring now also briefly to FIG. 9, where the relevant functions of the low level CM control logic 910 are illustrated. The low level CM control logic 910 includes a create distribution list function 912 (hereinafter create function) for creating a new distribution list. The low level CM control logic 910 further includes a delete or destroy distribution list function 912 (hereinafter delete or destroy function) for deleting or destroying a distribution list. The low level CM control logic 910 further includes a low level send data function 916 (hereinafter the low level send function) for sending communications, exploiting the distribution lists of the present invention.

Additionally, in one embodiment designed for operating environments where in order to ensure the low level CM's sharability among multiple applications, the low level CM is constrained to ensure its total size (including its working data) is smaller than certain maximum allowable size. In this embodiment, the create function 912 is further equipped to reject a create request, if the create request requires the create function 912 to create a new distribution list beyond the low level CM's constrained maximum size allowable.

Figure 13:
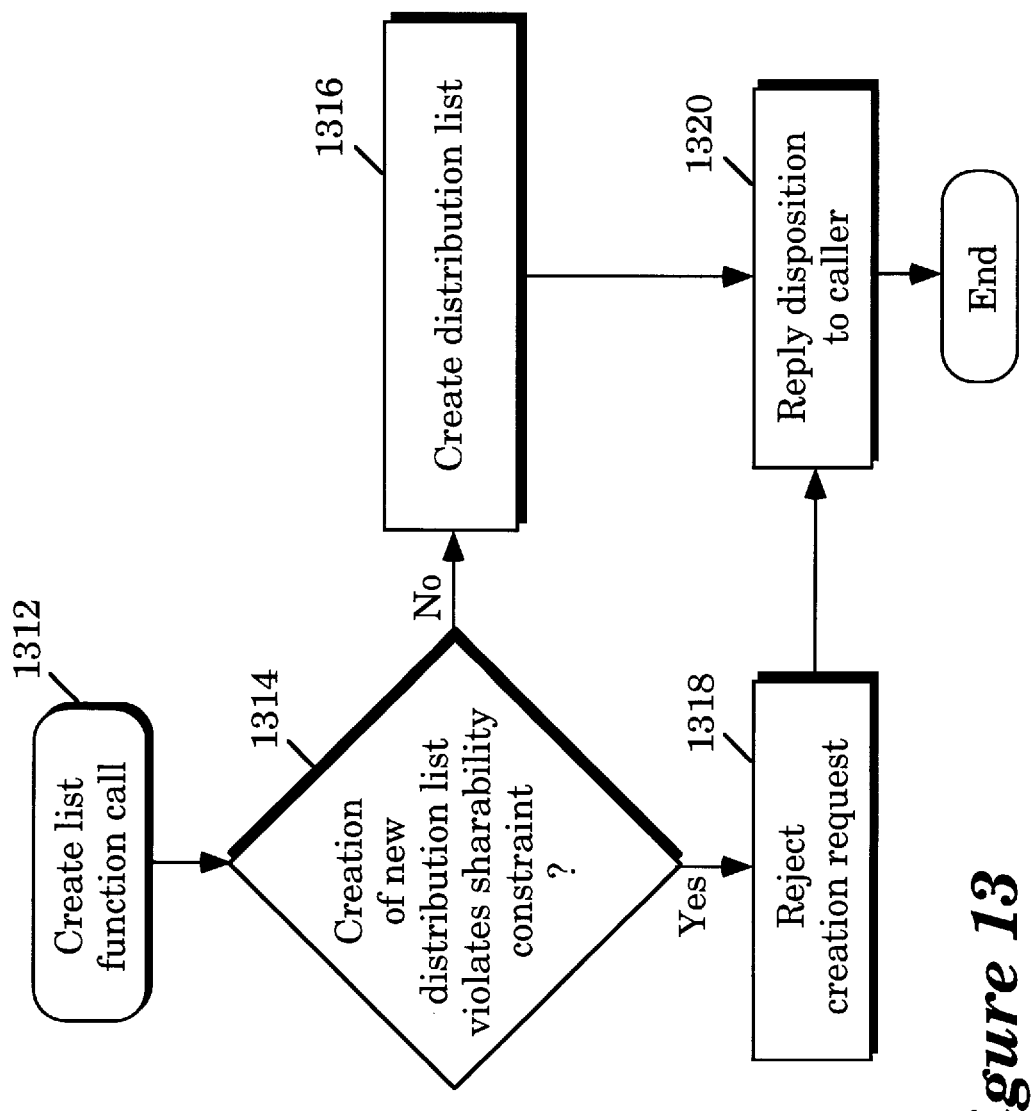
FIG. 13 illustrates a flow chart of the method steps for the creation of a distribution list, in accordance with one embodiment of the control logic of the low-level CM of FIG. 2.
Figure 14:
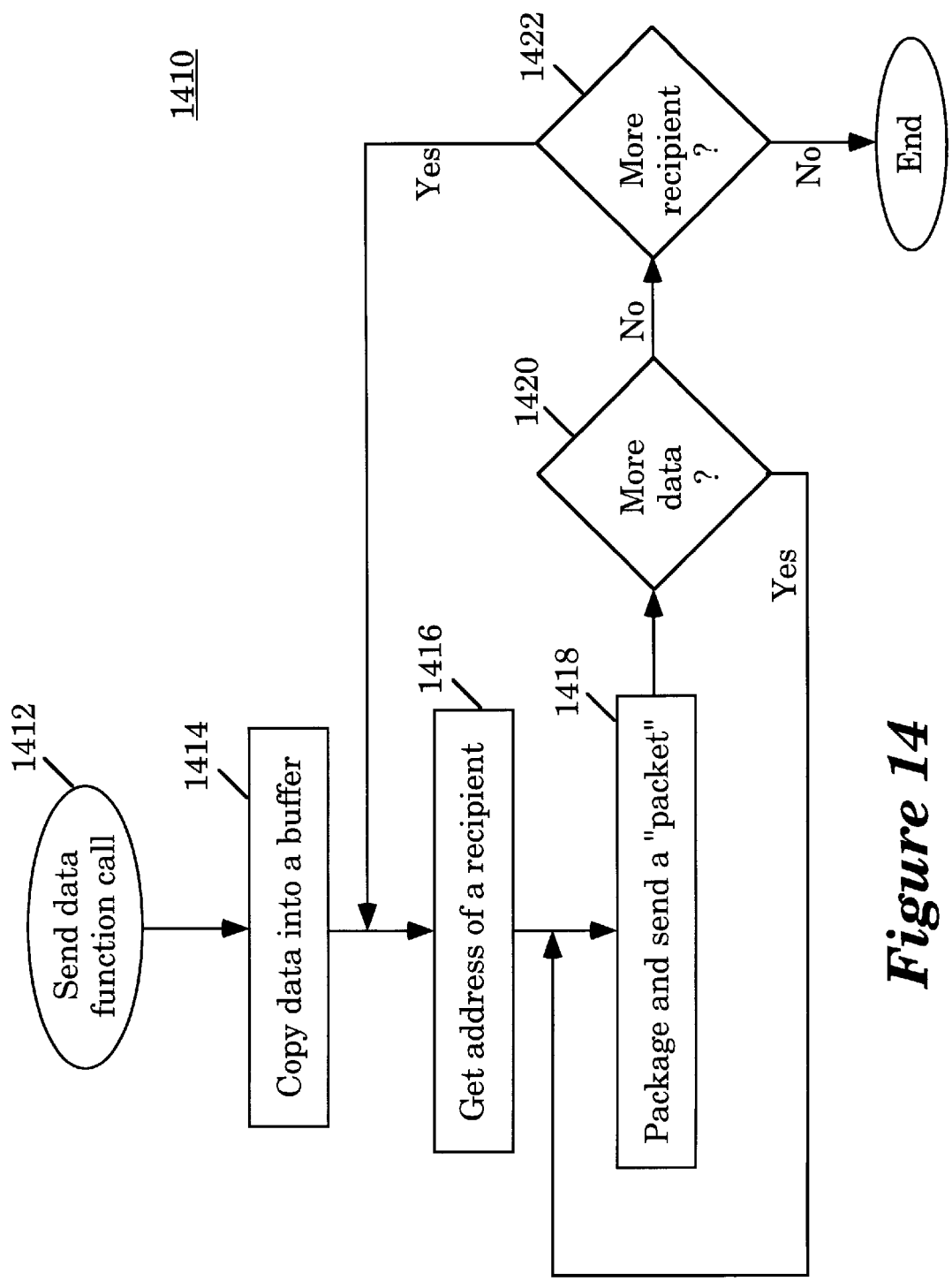
FIG. 14 illustrates a flow chart of the method steps for the functional operation of the control logic of the low-level CM of FIG. 2.

Skipping now further to FIGS. 13–14, where the operating flows of the create and low level send functions of the low level CM control logic are illustrated. Implementation of the delete or destroy function 914 is well within the ability of those skilled in the art, thus will not be described. As illustrated in FIG. 13, upon receipt of a create function call, step 1312, the create function determines if creation of the new communication recipient distribution list would cause the low level CM to violate its sharability constraint, step 1314. If the determination at step 1314 is negative, then the create function proceeds to step 1316, and creates the new distribution list, otherwise, it rejects the create request step 1318. Either case, the create function reports the final disposition to its caller (e.g. the mid-level CM) accordingly, step 1320. If the new distribution list was created, an identification "token" for the newly created distribution list is also provided.

As illustrated in FIG. 14, upon receipt of a low level send function call, step 1412, the low level send function allocates a buffer and copies the send data into the allocated buffer, step 1414. The send data are provided to the low level CM by the meeting manager (through the mid-level CM) as an integral part of the function call. Then, the low level send function gets the connection address of a recipient, step 1416. If the data is intended for one or all conference participants, the low level send function is provided with the connection address of the particularized conference participant, or an all recipient "token". If the data is intended to a subset of conference participants, the low level send function is provided with the identification "token" of the target distribution list. The low level send function in turn retrieves a connection address for one of the member participants, using the target distribution list and the distribution list member participant objects.

Then, the low level send function packages up a data packet and transmits the data packet to the recipient, step 1418. If more data remain to be sent, step 1420, the low level send function repeats step 1418, until all data are sent to the recipient. Upon sending all data to one recipient, step 1420, the low level send function determines if there are still more recipients who have not been sent the data, i.e. not all member participants of the target distribution list have been sent the data, step 1422. If there are more recipients, the low level send function repeats steps 1416–1420, until all member participants of the target distribution list have been sent the data.

While for ease of understanding, the present invention is being described with the low level send function sending data to the member participants of a target distribution list one at a time. Those skilled in the art will appreciate that the low level send data function may be designed in a re-entrant manner, such that multiple "threads" of the low level send function can be accessing the same buffer and sending the data to the various member participants of the target distribution list at the same time. Furthermore, for an embodiment where "nesting" of distribution lists is supported, the send data function may also be designed to call itself if a "recipient" in the distribution list is another distribution list identifier.

Thus, under the present invention, the meeting manager is alleviated with the burden of having to repeatedly identify the recipients of a message, one recipient at a time, whenever the meeting manager wants to send messages only to a subset of the conference participants. Furthermore, the low level CM is more efficient in that only one buffer will be employed for sending messages to a subset of conference participants.

Note that the discussion above refers specifically to a series of functions which are generated in a high-level object-oriented programming language (e.g., the Microsoft C/C++ Version 7.00 language) available from Microsoft, Inc., Redmond, Washington. This series of functions is compiled, linked, and then run as object code in a system such as the one illustrated in FIG. 1. It can be appreciated by one skilled in the art, however, that the method and apparatus of the present invention may be implemented in special purpose hardware devices, such as discrete logic devices, large scale integrated circuits (LSI's), application-specific integrated circuits (ASIC's), or other specialized hardware. The description here has equal application to apparatus having similar function.

Figure 4:
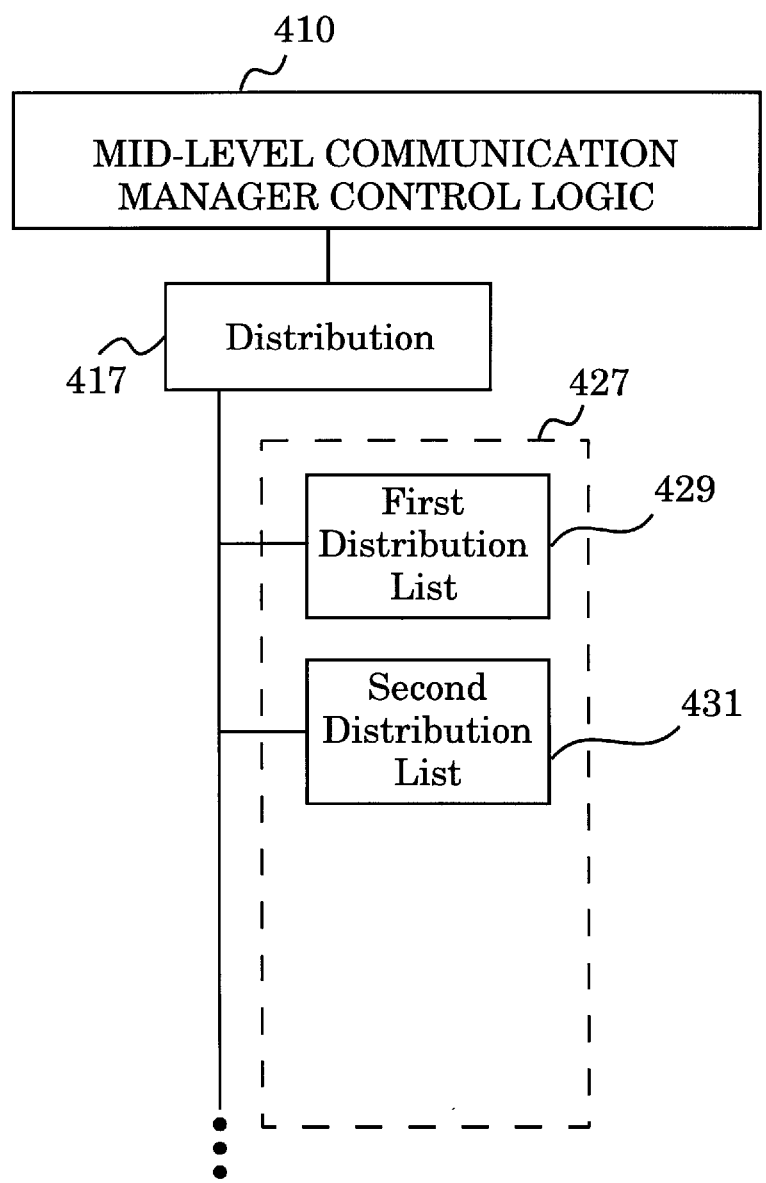
FIG. 4 illustrates one embodiment of the mid-level CM of FIG. 2 in further detail.

Referring back now to FIG. 4, a basic object manipulated by the mid-level CM control logic 410 is illustrated. The basic object a distribution list object 417 including multiple distribution list instances 427. The distribution list object 417 defines the conference participant combination instances 427 currently known to the mid-level CM. In other words, the identities of the distribution lists are maintained as distribution list instances 427 of the distribution list object 417. The distribution list instances 427 of the distribution list object 417 are individually marked as to whether they are also maintained by the low level CM. The usage by "applications" of each distribution list instance 427 of the distribution list object 417 is also tracked.

Figure 5:
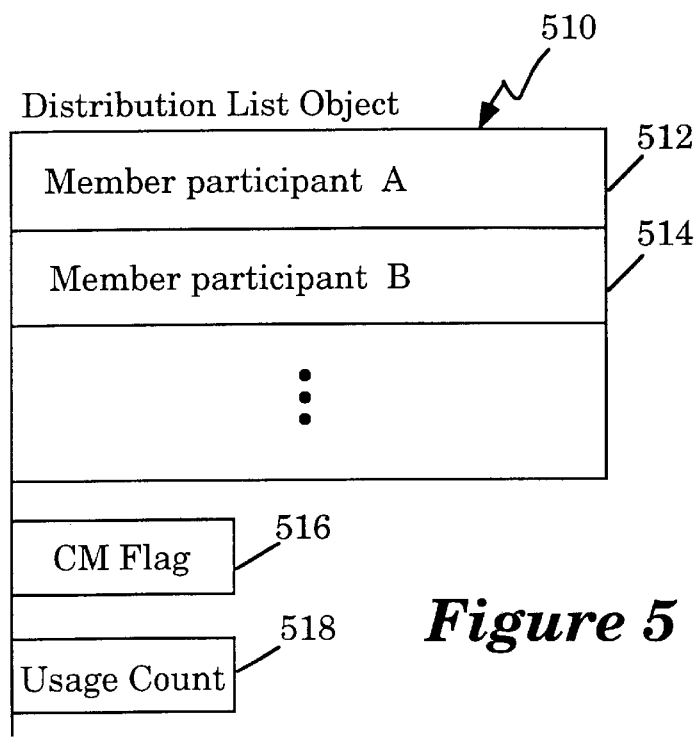
FIG. 5 illustrates one embodiment of a distribution list object of the mid-level CM in more detail.

Referring now briefly to FIG. 5, where the content of each distribution list instance 510 is illustrated. Similar to the distribution list instances maintained by the low level CM, each distribution list instance 810 includes the member participant identifications 512, 514. As described earlier, for an embodiment that supports "nesting" of distribution lists, the distribution list object 510 may also contains other distribution list identifiers. Additionally, as described earlier, the distribution list instance 510 includes a flag 516 when set denotes that the distribution list instance 510 is also maintained by the low level CM. In other words, the distribution list instance 510 is merely a copy, and not a distribution list instance 510 the low level CM unable to handle without violating its sharability constraint. Furthermore, the distribution list instance 510 includes a usage count 518 denoting the number of "applications" using the distribution list instance 510.

Figure 6:
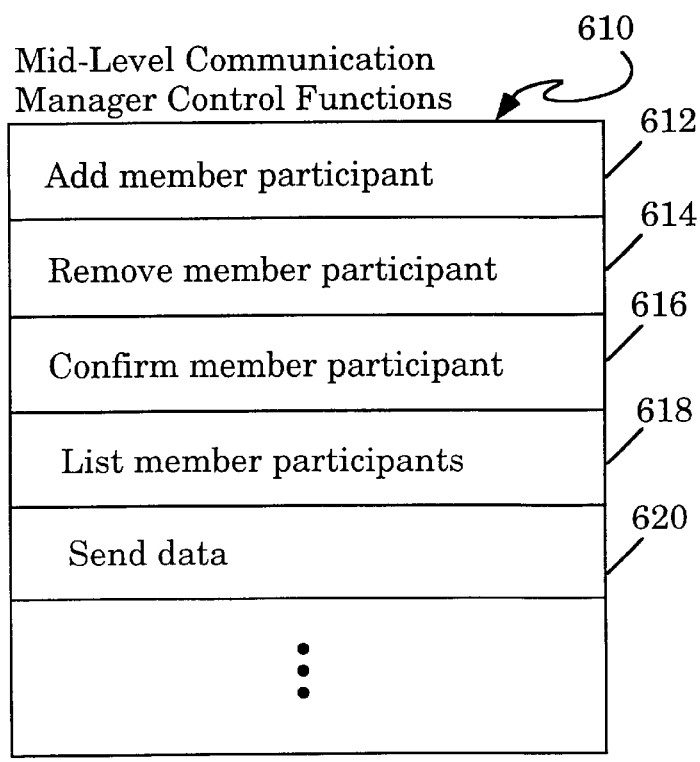
FIG. 6 illustrates one embodiment of the manager control function of the mid-level CM in more detail.

Referring now also briefly to FIG. 6, where the relevant functions of the mid-level CM control logic 610 are illustrated. The mid-level CM control logic 610 includes an add member participant function 612 (hereinafter add function) for adding a conference participant as a member of a distribution list. In one embodiment, if the distribution list does not exist, the add member participant function 612 creates a new distribution list. The mid-level CM control logic 610 further includes a remove member participant function 614 (hereinafter remove function) for removing a member participant from a distribution list. If the usage count of the target distribution list becomes zero after the removal, the remove function 614 further destroys the distribution list. If the distribution list being destroyed is also maintained by the low level CM, the remove function 614 would call the delete function of the low level CM to delete the low level CM's version of the distribution list. The mid-level CM control logic 610 further includes a mid-level send data function 620 (hereinafter mid-level send function) for sending communications, exploiting the communication recipient distribution lists of the present invention.

Additionally, in one embodiment, the mid-level CM control logic 610 also preferably includes a confirm member participant function 616 (hereinafter confirm function) for confirming a conference participant is already a member participant of a particular distribution list. The mid-level CM control logic further preferably includes a list member participant function 618 (hereinafter list function) for listing the member participants of a particular distribution list. The implementations of the confirm and list functions 616 and 618 are well within the ability of those skilled in the art, thus they will not be further described.

Figure 10:
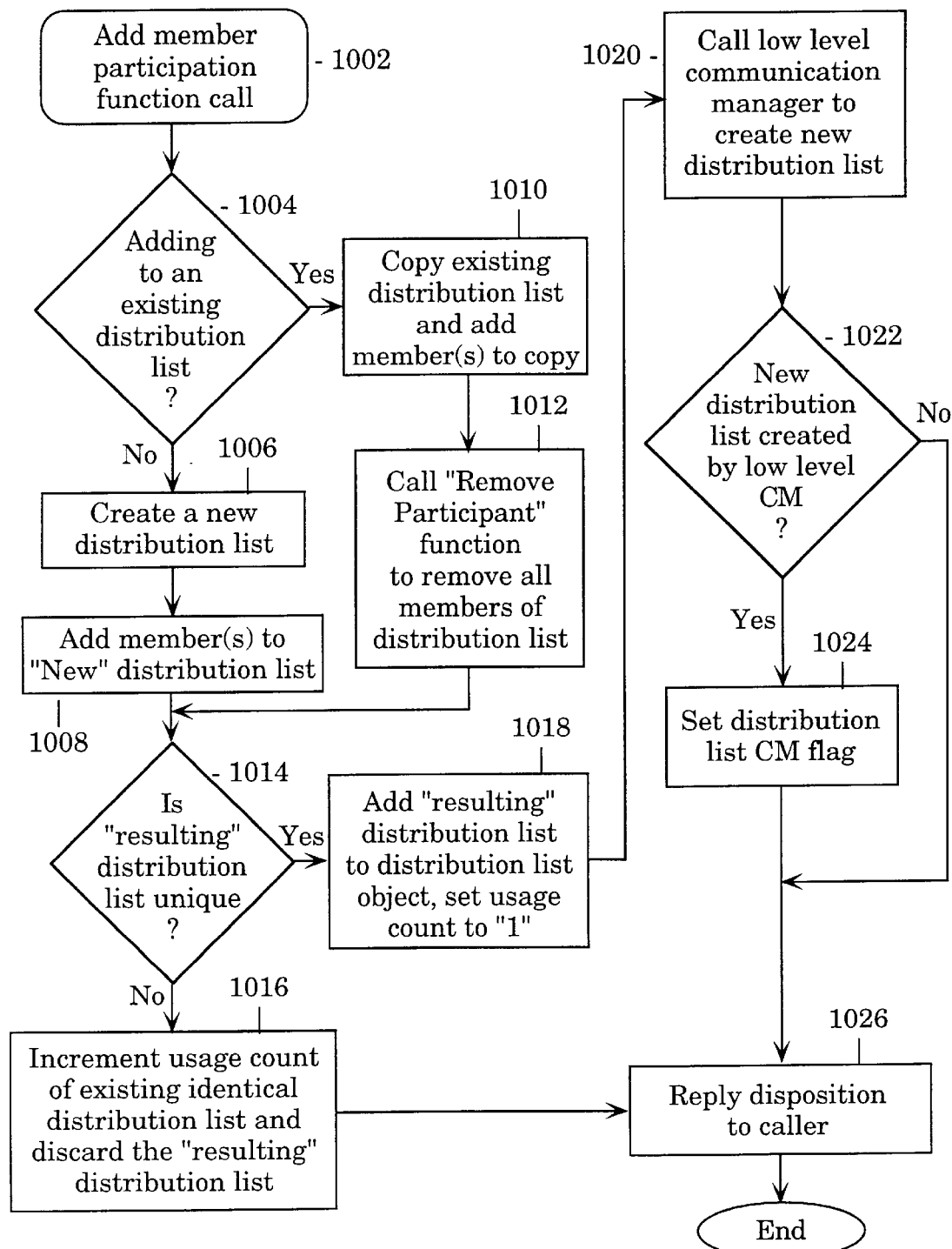
FIG. 10 illustrates a flow chart of the method steps for adding a distribution list participant, in accordance with one embodiment of the control logic of the mid-level CM of FIG. 2.
Figure 11A:
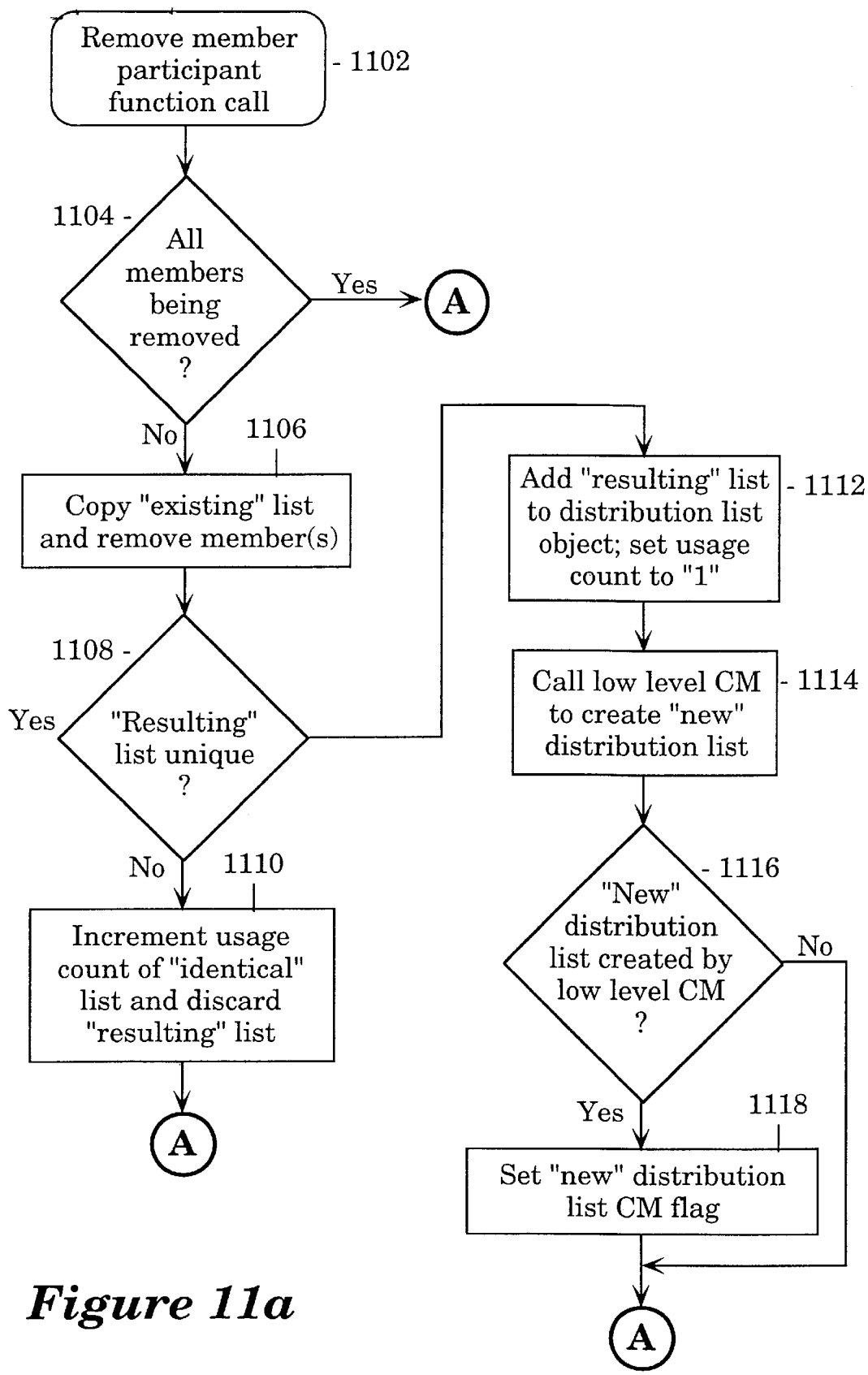
FIGS. 11a and 11b illustrate a flow chart of the method steps for removing a distribution list participant, in accordance with one embodiment of the control logic of the mid-level CM of FIG. 2.
Figure 11B:
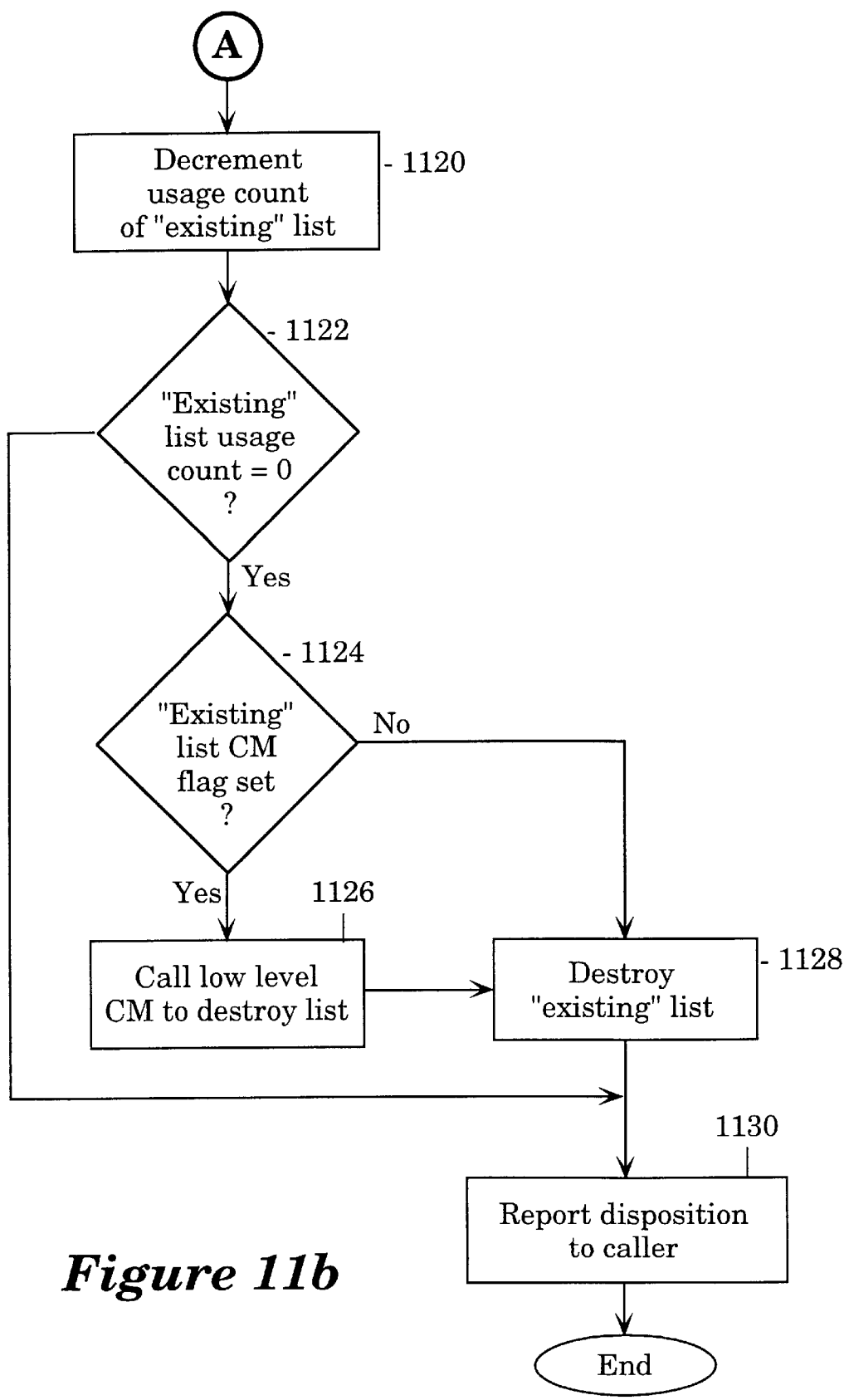
Figure 12:
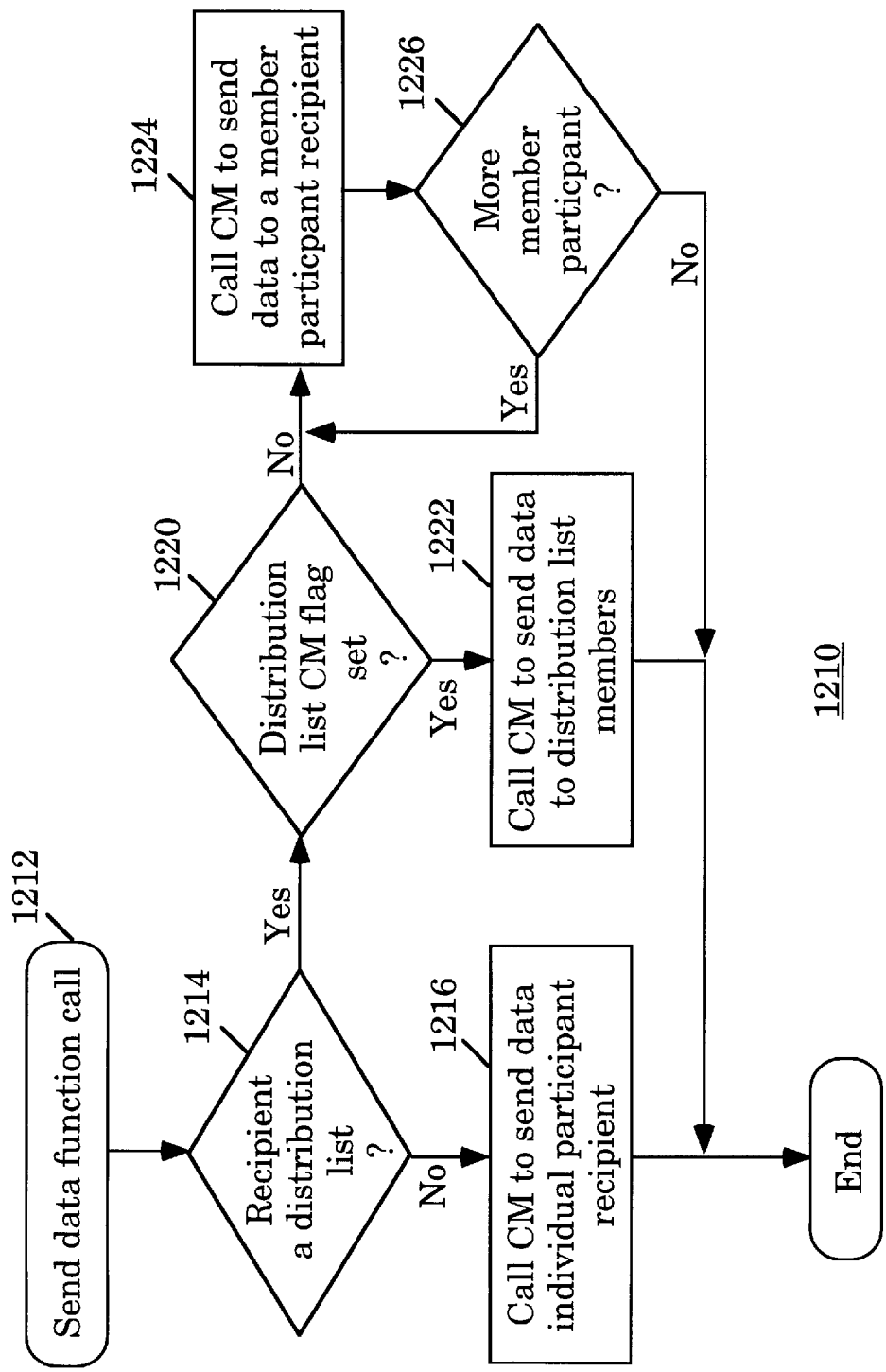
FIG. 12 illustrates a flow chart of the method steps for the functional operation of the control logic of the mid-level CM of FIG. 2.

Skipping now further to FIGS. 10–12, where the operating flows of the add, remove, and send functions of the mid-level CM control logic are illustrated. As illustrated in FIG. 10, upon invocation, step 1002, the add function determines if the target distribution list is an existing distribution list, step 1004. If the add function determines that the target distribution list is not an existing distribution list, it creates a "new" distribution list, step 1006, and add the members(s) to the "new" distribution list, step 1008.

On the other hand, if it is determined at step 1004 that the target distribution list is an existing distribution list, the create function copies the existing distribution list, and adds the member(s) to the "copy", step 1010. Upon adding the member(s) to the "copy", the add function calls the remove function to remove all members of the "existing" distribution list, step 1012.

Upon either adding the member(s) to a "new" distribution list (step 1008) or a "copy" of an existing distribution list (step 1012), the add function determines if the "resulting" distribution list is unique. If the "resulting" distribution list is not unique, i.e. the distribution list with the final list of members is already in existence, the add function increments the usage count of the "identical" distribution list, and discard the "resulting" distribution list, step 1016. Then, the add function replies to its caller (e.g. the meeting manager) accordingly, step 1026.

If it is determined at step 1014 that the "resulting" distribution list is not unique, the add function adds the "resulting" distribution list to the distribution list object, and sets the usage count of the newly added distribution list to "1", step 1018. Upon doing so, the add function calls the low level CM to create the newly added distribution list, step 1020. If the low level CM is successful in creating the newly added CM, the add function sets the CM flag of the newly added distribution list, step 1024. In either case, the add function also replies to its caller accordingly, step 1026.

As illustrated in FIGS. 11a and 11b, upon invocation, step 1102, the remove function determines if all members of the target distribution list are being removed, step 1104. If it is determined at step 1104 that not all members are being removed from the target distribution list, the remove function copies the "existing" distribution list and remove the member(s) from the "copy", step 1106. Then, the remove function determines if the "resulting" distribution list is unique, i.e. whether the distribution list with the final list of members has already been defined, step 1108. If it is determined at step 1108 that the "resulting" distribution list is not unique, the remove function increments the usage count of the "identical" distribution list and discards the "resulting" distribution list, step 1110. Otherwise, the remove function adds the "resulting" distribution list to the distribution list object, and sets the usage count of the newly added distribution list to "1", step 1 112. The remove function further calls the low level CM to create the "new" distribution list, step 1114, and if the low level CM creates the "new" distribution list as requested, step 1116, the remove function also sets the CM flag of the newly created distribution list, step 1118.

In all three cases, i.e. upon determining all members are being removed from the target distribution list (step 1104), or handling a non-unique "resulting" list in a partial removal situation (step 1110) or handling a unique "resulting" list in a partial removal situation (step 1118), the removal function decrements the usage count of the "existing" distribution list (the list against which the removal operation is to be performed), step 1120. If the decremented usage count remains non-zero, the remove function replies to its caller accordingly, steps 1122 and 1130, and takes no further action.

On the other hand, if the decremented usage count becomes zero, step 1122, the remove function destroys the "existing" distribution list, step 1128. However, before destroying the "existing" distribution list, step 1128, the remove function determines if the CM flag is set, step 1124, and if the CM flag is set, the remove function further calls the low level CM to destroy its version of the distribution list, step 1126. Upon destroying the "existing" distribution list (step 1128), the remove function replies to its caller (e.g. the meeting manager) accordingly, step 1130.

As illustrated in FIG. 12, upon invocation, step 1212, the mid-level send function determines if the intended recipient is member participants of a distribution list, step 1214. If the determination is negative at step 1214, the mid-level send function simply calls the low level CM to send the data to a particularized conference participant. On the other hand, if the determination at step 1214 is positive, the mid-level send function further determines if the CM flag of the target distribution list is set, step 1220.

If the CM flag is set, i.e. the target distribution list is being maintained by the low level CM, the mid-level send function simply calls the low level CM to send the data to all member participants of the distribution list, naming only the distribution list, step 1222. On the other hand, if it was determined that the CM flag was not set at step 1220, i.e. the distribution list is not being maintained by the low level CM, the mid-level send function then calls the low level CM repeatedly to send data to the member participants of the target distribution list, one at a time, using its own distribution list, until member participants of the target distribution list have been provided with the data, steps 1224 and 1226.

Similar to the low level send data function, in the embodiment where "nesting" of distribution lists is supported, at step 1224, the send function may be designed to invoke itself (instead of the low level CM), if a "recipient" in the distribution list is another distribution identifier, recursively re-entering step 1212 again.

Thus, a method and apparatus for managing communications with selective subsets of conference participants is described. While the method and apparatus of the present invention has been described in terms of the illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A computer system for use as a communication end-point, the computer system comprising:

a) an execution unit for executing programs; and b) a storage unit storing a first communication manager to be executed by the execution unit during operation, the first communication manager being equipped with b.1.1) logic for maintaining a first plurality of communication distribution lists, each of the first communication distribution lists being uniquely identifiable and having at least one list member, each list member being a remote recipient of communications or a distribution list identifier, the first communication manager having sharability constraints to ensure sharability of the first plurality of communication distribution lists among a plurality of communication applications, and b.1.2) logic for performing physical layer services for communicating with other communication end-point computer systems including logic for sending a communication to all remote recipients who are unnested or nested members of one of the first communication distribution lists, on behalf of an application being executed by the execution unit, upon so instructed with instructions which, for recipient information, merely supply the unique identification information of a particular one of the first communication distribution lists.

2. The computer system as set forth in claim 1, wherein the logic for maintaining the first communication distribution lists includes b.1.1.1) logic for creating one of the first communication distribution lists responsive to a create request, b.1.1.2) logic for deleting one of the first communication distribution lists responsive to a delete request.

3. The computer system as set forth in claim 2, wherein the logic for creating one of the first communication distribution lists includes logic for detecting whether creating the one of the first communication distribution lists would violate sharability constraints on the first communication manager, and rejecting the request upon detecting such potential violation.

4. The computer system as set forth in claim 1, wherein, the logic for maintaining the first communication distribution lists stores only identification information of the remote recipient for each remote recipient list member in each of the first communication distribution lists;

the logic for maintaining the first communication distribution lists further maintains a distribution list participant directory comprising identification and destination information of each remote recipient.

5. The computer system as set forth in claim 1, wherein, the logic for sending a communication to all remote recipients on behalf of the application includes logic for sending the communication without using duplicate data buffers when supplied with the unique identification information of a particular one of the first communication distribution lists.

6. The computer system as set forth in claim 5, wherein, the logic for sending a communication to all remote recipients on behalf of the application further includes logic for invoking the sending logic itself for sending the communication to remote recipients who are nested list members of the particular one of the first communication distribution lists.

7. The computer system as set forth in claim 1, wherein, said storage unit further stores a second communication manager being executed by the execution unit during operation, the second communication manager including b.2.1) logic for maintaining a second plurality of communication distribution lists, the second communication distribution lists being a superset of the first communication distribution lists, each of the second communication distribution lists also being uniquely identifiable and having at least one list member, each list member also being a remote recipient of communications or a distribution list identifier, each of the second communication distribution lists further having an indicator indicating whether there is an identical one maintained among the first communication distribution lists, each of the second communication distribution lists further having a usage count of applications being executed by execution unit using the particular one of the second communication distribution lists, and b.2.2) logic for requesting physical layer services for communicating with other communication end-point computer systems including logic for making individualized requests to the first communication manager if the communication is intended for all remote recipients who are unnested or nested members of one of the second communication distribution lists without an identical one being maintained among the first communication distribution lists, and for making a single consolidated request supplying merely unique identification information of a corresponding one of the first communication distribution lists to the first communication manager if the communication is intended for all remote recipients who a re unnested or nested members of one of the second communication distribution lists having an identical one being maintained among the first communication distribution lists.

8. The computer system as set forth in claim 7, wherein the logic for maintaining the second communication distribution lists includes b.2.1.1) logic for adding a remote recipient to one of the second communication distribution lists responsive to an add request, including logic for requesting the first communication manager to create a corresponding one among the first communication distribution lists if a resulting one of the second communication distribution lists from performing the add request is a new unique one of the second communication distribution lists, b.2.1.2) logic for removing a remote recipient from one of the second communication distribution lists responsive to a remove request, including logic for requesting the first communication manager to destroy a corresponding one among the first communication distribution lists, if the usage count of the one among the second communication distribution lists against which the removal request is to be performed goes to zero upon performing the removal request and the usage count going to zero one of the second communication distribution lists is also maintained by the first communication manager.

9. The computer system as set forth in claim 8, wherein the logic for adding a remote recipient to one of the second communication distribution lists further includes logic for determining whether the resulting one of the second communication distribution lists upon performing the add request is unique, logic for setting the usage count of the resulting one of the second communication distribution lists to one if the resulting one of the second communication distribution lists is unique, and logic for incrementing the usage count of an identical one of the second communication distribution lists by one and discarding the resulting one of the second communication distribution lists if the resulting one of the second communication distribution lists is not unique.

10. The computer system as set forth in claim 9, wherein the logic for adding a remote recipient to one of the second communication distribution lists further includes logic for creating a new one of the second communication distribution lists and adding the remote recipient to the new one of the second communication distribution lists if the one of the second communication distribution lists against which the add request is to be performed has not been previously created, and logic for copying one of the second communication distribution lists and adding the remote recipient to the copied one of the second communication distribution lists if the one of the second communication distribution lists against which the add request is to be performed has been previously created.

11. The computer system as set forth in claim 8, wherein the logic for removing a remote recipient from one of the second communication distribution lists further includes logic for determining whether the resulting one of the second communication distribution lists, upon performing the removal request, is unique, logic for setting the usage count of the resulting one of the second communication distribution lists to one if the resulting one of the second communication distribution lists is unique, and logic for incrementing the usage count of an identical one of the second communication distribution lists by one and discarding the resulting one of the second communication distribution lists if the resulting one of the second communication distribution lists is not unique.

12. The computer system as set forth in claim 11, wherein the logic for removing a remote recipient from one of the second communication distribution lists further includes logic for copying one of the second communication distribution lists and removing the remote recipient from the copied one of the second communication distribution lists.

13. In a network of communication end-point computer systems comprising a plurality of applications executing on the computer systems communicating with one another, an automated method implemented in at least one of said computer systems for selectively distributing communications to the other computer systems, the method comprising the steps of:

a) maintaining a first plurality of communication distribution lists by a first communication manager on the communication end-point computer system, the first communication manager having sharability constraints to ensure the sharability of the first plurality of communication distribution lists among the plurality of applications, each of the communication distribution lists being uniquely identifiable and having at least one list member, each list member being a remote recipient of communication on the other communication end-point computer systems or a distribution list identifier, and b) performing physical layer services by the first communication manager for communicating with remote recipients on the other communication end-point computer systems by nested members of one of the first communication distribution lists, one behalf of an application executing on the communication end-point computer system, upon so instructed with instruction which, for recipient information, merely supply the unique identification information of a particular one of the first communication distribution lists.

14. The method as set forth in claim 13, wherein step (a) comprises the steps of:

a.1) creating one of the first communication distribution lists by the first communication manager responsive to a create request, a.2) deleting one of the first communication distribution lists by the first communication manager responsive to a delete request.

15. The method as set forth in claim 14, wherein step (a.1) further comprises detecting by the first communication manager whether creating one of the first communication distribution lists would violate sharability constraints on the first communication manager, and rejecting by the first communication manager the create request upon detecting such potential violation.

16. The method as set forth in claim 13, wherein, step (a) comprises storing only identification information of the remote recipient for each remote recipient list member in each of the first communication distribution lists by the first communication manager;

step (a) further comprises maintaining a distribution list participant directory by the first communication manager having identification and destination information of each remote recipient.

17. The method as set forth in claim 13, wherein, sending a communication to all remote recipients on behalf of the application in step (b) comprises sending the communication by the first communication manager without using duplicate data buffers when supplied with the unique identification information of a particular one of the first communication distribution lists.

18. The method as set forth in claim 13, wherein, sending a communication to all remote recipients on behalf of the application in step (b) involves recursive performance of step (b) for sending the communication to remote recipients who are nested list members of the particular one of the first communication distribution lists, one nesting level at a time.

19. The method as set forth in claim 13, wherein, the method further comprises the steps of c) maintaining a second plurality of communication distribution lists by a second communication manager, the second communication distribution lists being a superset of the first communication distribution lists, each of the second communication distribution lists also being uniquely identifiable and having at least one list member, each list member also being a remote recipient of communications or a distribution list identifier, each of the second communication distribution lists further having an indicator indicating whether there is an identical one maintained among the first communication distribution lists, each of the second communication distribution lists further having a usage count of executing applications using the particular one of the second communication lists, and d) requesting physical layer services for communicating with other communication end-point computer systems by the second communication manager including making individualized requests to the first communication manager if the communication is intended for all recipients of the one of the second communication distribution lists without an identical one being maintained among the first communication distribution lists, and making a single consolidated request supplying merely unique identification information of an identical one of the first communication distribution lists to the first communication manager if the communication is intended for all recipients of one of the second communication distribution lists being maintained among the first communication distribution lists.

20. The method as set forth in claim 19, wherein step (c) comprises:
   c.1) adding a remote recipient to one of the second communication distribution lists by the second communication manager responsive to an add request, and requesting the first communication manager to create a corresponding one among the first communication distribution lists by the second communication manager if a resulting one of the second communication distribution lists from performing the add request is a new unique one of the second communication distribution lists,
   c.2) removing a remote recipient from one of the second communication distribution lists by the second communication manager, and requesting the first communication manager to destroy a corresponding one among the first communication distribution lists by the second communication manager, if the usage count of the one among the second communication distribution lists against which the removal request is to be performed goes to zero upon performing the removal request and the usage count going to zero one of the second communication distribution lists is also maintained by the first communication manager.

21. The method as set forth in claim 20, wherein step (c.1) further includes determining whether the resulting one of the second communication distribution lists upon performing the add request is unique by the second communication manager, setting the usage count of the resulting one of the second communication distribution lists to one by the second communication manager if the resulting one of the second communication distribution lists is unique, incrementing the usage count of an identical one of the second communication distribution lists by one by the second communication manager, and discarding the resulting one of the second communication distribution lists by the second communication manager if the resulting one of the second communication distribution lists is not unique.

22. The method as set forth in claim 21, wherein step (c.1) further includes creating a new one of the second communication distribution lists and adding the remote recipient to the new one of the second communication distribution lists by the second communication manager if the one of the second communication distribution lists against which the add request is to be performed has not been previously created, and copying one of the second communication distribution lists and adding the remote recipient to the copied one of the second communication distribution lists by the second communication manager if the one of the second communication distribution lists against which the add request is to be performed has been previously created.

23. The method as set forth in claim 20, wherein step (c.2) further includes determining whether the resulting one of the second communication distribution lists upon performing the removal request is unique by the second communication manager, setting the usage count of the resulting one of the second communication distribution lists to one by the second communication manager if the resulting one of the second communication distribution lists is unique, incrementing the usage count of an identical one of the second communication distribution lists by one by the second communication manager, and discarding the resulting one of the second communication distribution lists by the second communication manager if the resulting one of the second communication distribution lists is not unique.

24. The method as set forth in claim 23, wherein step (c.2) further includes copying one of the second communication distribution lists and removing the remote recipient from the copied one of the second communication distribution lists by the second communication manager.

25. A communication end-point conferencing system, the conferencing system comprising:
   a) a first communication manager equipped with
      a.1) logic for maintaining a first plurality of conference communication distribution lists being uniquely identifiable and having at least one list member, each list member being a remote recipient of conference communications or a distribution list identifier, the logic including sharability constraints to ensure the sharability of the first plurality of conference communication distribution lists among a plurality of communication applications executable by the communication end-points, and
      a.2) logic for performing physical layer services for communicating with other communication end-point conferencing systems including logic for sending a conference communication to all remote recipients who are unnested or nested members of one of the conference communication distribution lists, on behalf of a user-initiated conferencing application, upon so instructed with instructions which, for recipient information merely supply the unique identification information of a particular one of the first conference communication distribution lists.

26. The conferencing system as set forth in claim 25, wherein,
   the logic for maintaining the first conferencing communication distribution lists stores only identification information of the remote recipient for each remote recipient list member in each of the first conferencing communication distribution lists;
   the logic for maintaining the first conferencing communication distribution lists further maintains a distribution list participant directory comprising identification and destination information of each remote recipient.

27. The conferencing system as set forth in claim 26, wherein the logic for maintaining the first conferencing communication distribution lists includes
   a.1.1) logic for creating one of the first conferencing com4munication distribution lists responsive to a create request, and
   a.1.2) logic for deleting one of the first conferencing communication distribution lists responsive to a delete request.

28. The conferencing system as set forth in claim 25, wherein, the logic for sending a conferencing communication to all remote recipients on behalf of the conferencing application includes logic for sending the conferencing communication without using duplicate data buffers when supplied with the unique identification information of a particular one of the first conferencing communication distribution lists.

29. The conference system as set forth in claim 28, wherein, the logic for sending a communication to all remote recipients on behalf of the application further includes logic for invoking the sending logic itself for sending the communication to remote recipients who are nested list members of the particular one of the first communication distribution lists.

30. The conferencing system as set forth in claim 25, wherein, the conferencing system further comprises:

b) a second communication manager equipped with
- b.1) logic for maintaining a second plurality of conferencing communication distribution lists, the second conferencing communication distribution lists being a superset of the first conferencing communication distribution lists, each of the second conferencing communication distribution lists also being uniquely identifiable and having at least one list member, each list member also being a remote recipient of conferencing communications or a distribution list identifier, each of the second conferencing communication distribution lists further having an indicator indicating whether there is an identical one maintained among the first conferencing communication distribution lists, each of the second conferencing communication distribution lists further having a usage count of conferencing applications using the particular one of the second conferencing communication distribution lists, and
- b.2) logic for requesting physical layer services for communicating with other communication end-point conferencing systems including logic for making individualized requests to the first communication manager if the conferencing communication is intended for all remote recipients who are unnested or nested members of one of the second conferencing communication distribution lists without an identical one being maintained among the first conferencing communication distribution lists, and for making a single consolidated request supplying merely unique identification information of an identical one of the first conferencing communication distribution lists to the first communication manager if the communication is intended for all remote recipients who are unnested or nested list members of one of the second conferencing communication distribution lists also being maintained among the first conferencing communication distribution lists.

31. The conferencing system as set forth in claim 30, wherein the logic for maintaining the second conferencing communication distribution lists includes
- b.1.1) logic for adding a remote recipient to one of the second conferencing communication distribution lists responsive to an add request, including logic for requesting the first communication manager to create a corresponding one among the first conferencing communication distribution lists if a resulting one of the second conferencing communication distribution lists from performing the add request is a new unique one of the second conferencing communication distribution lists,
- b.1.2) logic for removing a remote recipient from one of the second conferencing communication distribution lists responsive to a remove request, including logic for requesting the first communication manager to destroy a corresponding one among the first conferencing communication distribution lists, if the usage count of the one among the second conferencing communication distribution lists against which the removal request is to be performed goes to zero upon performing the removal request and the usage count going to zero one of the second conferencing communication distribution lists is also maintained by the first communication manager.

* * * * *